July 6, 1965 F. B. MERCER 3,193,604
PROCESS AND APPARATUS FOR PRODUCING RIBBED SHEETING
Original Filed April 8, 1959 8 Sheets-Sheet 1

Inventor
F. B. Mercer
By A. Ralph Snyder
Atty

July 6, 1965   F. B. MERCER   3,193,604
PROCESS AND APPARATUS FOR PRODUCING RIBBED SHEETING
Original Filed April 8, 1959   8 Sheets-Sheet 2

Inventor
F. B. Mercer
Atty

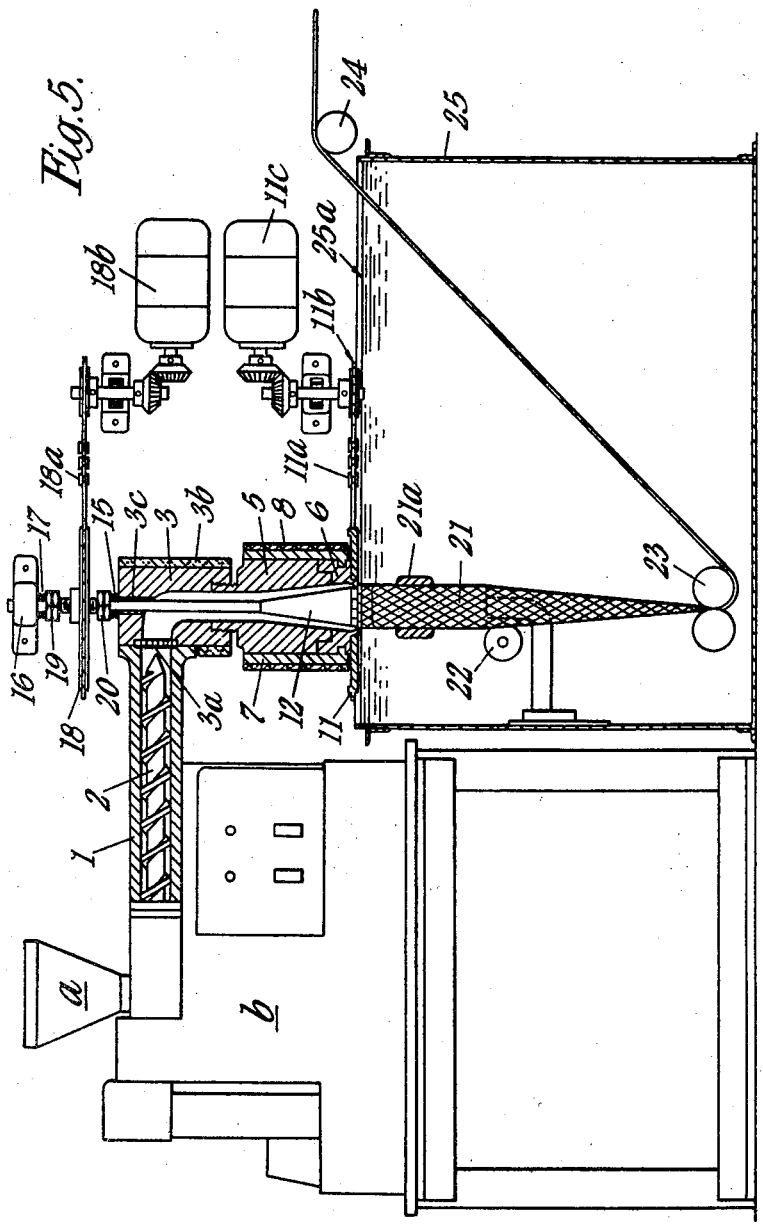

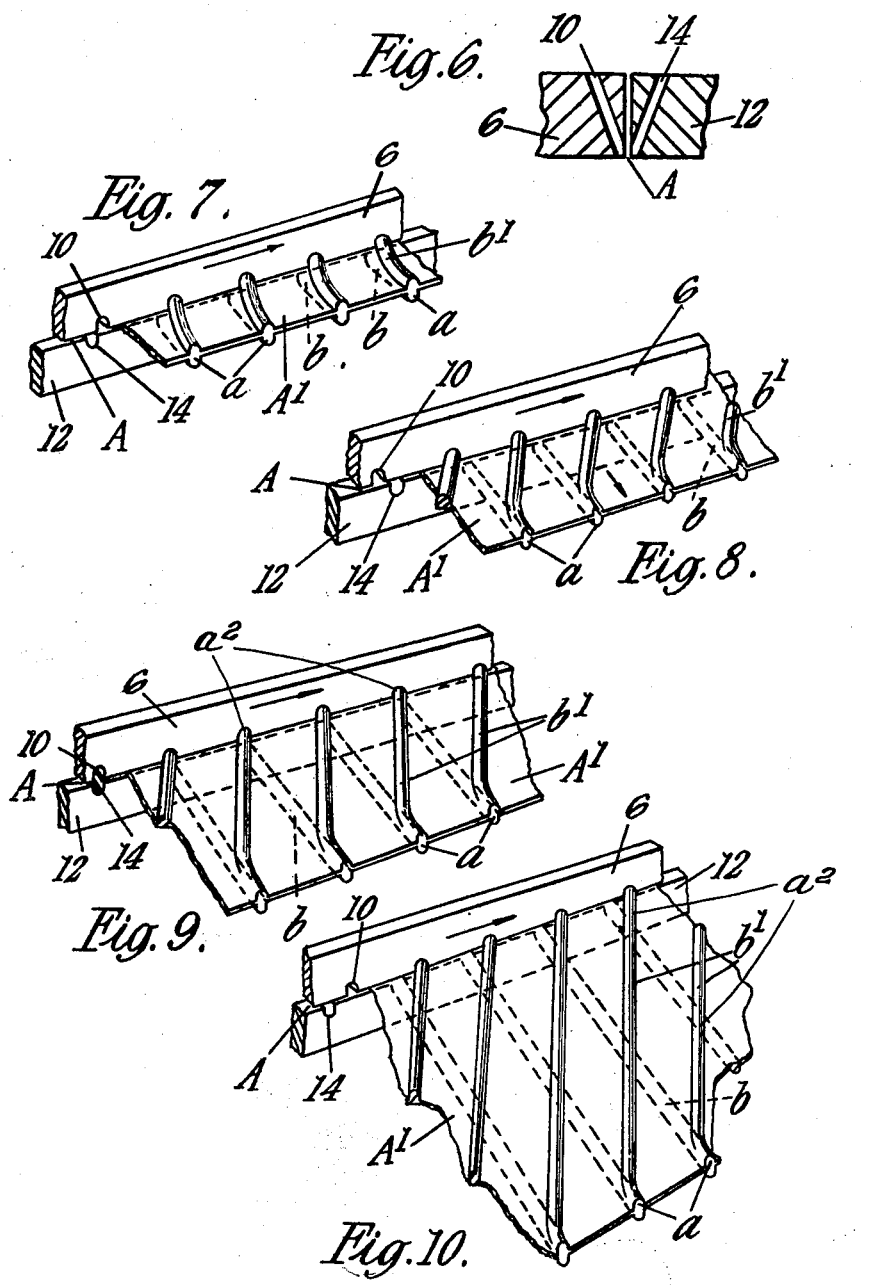

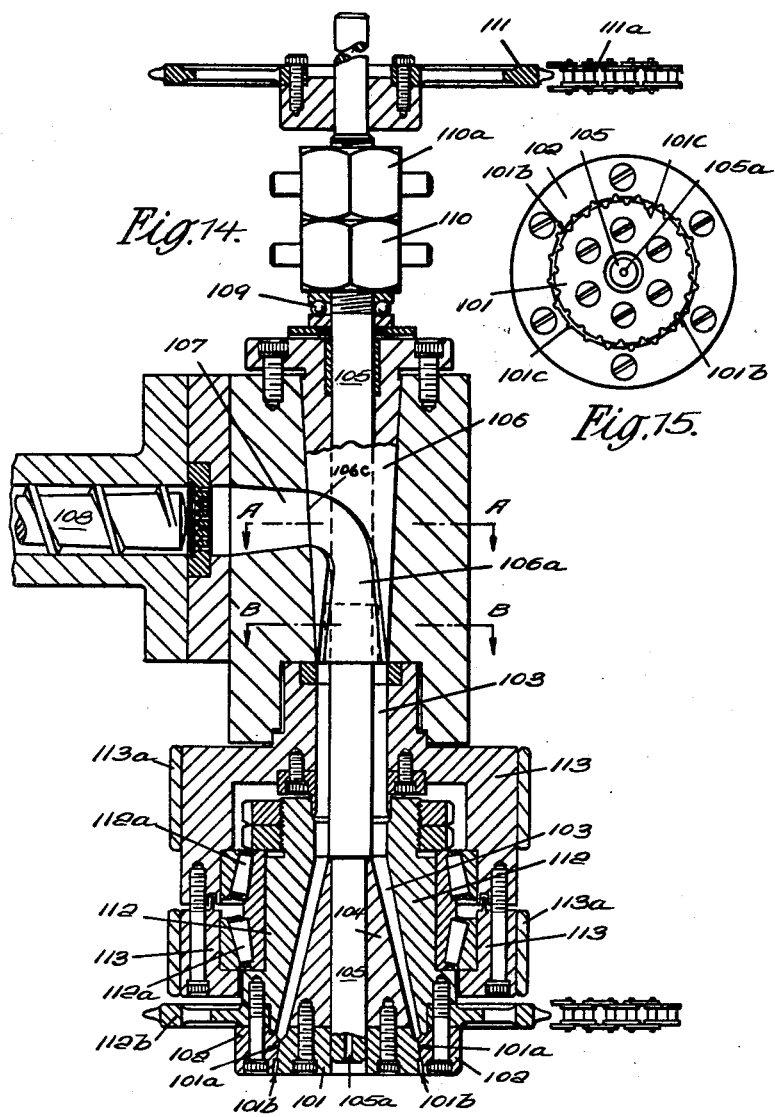

July 6, 1965 F. B. MERCER 3,193,604
PROCESS AND APPARATUS FOR PRODUCING RIBBED SHEETING
Original Filed April 8, 1959 8 Sheets-Sheet 6

INVENTOR
FRANK BRIAN MERCER

BY
ATTORNEY

July 6, 1965 F. B. MERCER 3,193,604
PROCESS AND APPARATUS FOR PRODUCING RIBBED SHEETING
Original Filed April 8, 1959 8 Sheets-Sheet 7

INVENTOR
FRANK BRIAN MERCER

BY
ATTORNEY

July 6, 1965 F. B. MERCER 3,193,604
PROCESS AND APPARATUS FOR PRODUCING RIBBED SHEETING
Original Filed April 8, 1959 8 Sheets-Sheet 8

INVENTOR
FRANK BRIAN MERCER,
BY
ATTORNEY

United States Patent Office 3,193,604
Patented July 6, 1965

3,193,604
PROCESS AND APPARATUS FOR PRODUCING RIBBED SHEETING
Frank Brian Mercer, Blackburn, England, assignor to Plastic Textile Accessories Limited, Blackburn, England
Continuation of applications Ser. No. 805,003, Apr. 8, 1959, and Ser. No. 837,854, Sept. 3, 1959. This application Oct. 26, 1960, Ser. No. 65,089
Claims priority, application Great Britain, Nov. 9, 1955, 32,001; Sept. 18, 1958, 29,946; Mar. 19, 1959, 9,011
20 Claims. (Cl. 264—209)

This invention relates to extruded plastic material in the form of sheets, tubes, piping and the like (hereinafter broadly referred to as "sheeting," whether such be flat or in tubular form). More particularly, this invention relates to sheeting which has integrally extruded reinforcing strands or ribs on its surfaces, and process and apparatus for its production. This application is a continuation of applicant's U.S. applications, Serial No. 805,003 now abandoned, filed April 8, 1959, and Serial No. 837,854 now abandoned, filed September 3, 1959, each of which is a continuation-in-part of applicant's U.S. application Serial No. 617,161, filed October 19, 1956, now U.S. Patent 2,919,467.

Plain plastic films or sheetings are used to a large extent for rain wear, umbrellas, etc. but these plain materials suffer from the objection that they are easily torn. Further, the torn portions may not remain localized resulting in a virtual destruction of the complete article. A solution to this problem has been, in the past, to manufacture the sheeting at a uniform thickness or gauge which would be necessary to resist tearing although a much thinner gauge could be tolerated and still satisfy the other requirements of the sheeting material. Using thicker sheeting often results in less flexible, more costly material. Thin, unreinforced sheeting has the further drawback of sometimes being difficult to handle or pass through bagmaking or other machinery for treating or otherwise making up the film. In addition to all the foregoing, plain sheeting can, for many purposes, be too drab or unattractive, especially when used in consumer goods where the style or design is important from an advertising standpoint.

It is, therefore, an object of this invention to provide a method and apparatus for producing reinforced plastic sheeting which will be wear-and-tear resistant, stronger, decorative and will exhibit good dimensional stability. A further object is to provide a method and apparatus for producing such sheeting by extruding reinforcing ribs or strands simultaneously and integrally with the material of the sheeting. A still further object is to provide a continuous method and appaartus for producing such reinforced sheeting. Yet another object is to provide a method and apparatus for continuously producing such sheeting in tubular form being reinforced on both surfaces. Many other objects will appear hereinafter.

The instant invention also comprises a method of manufacturing a plastic sheeting containing integral reinforcing strands on both sides of the sheeting which comprises extruding the plastic in the form of thin sheeting containing integral strand-forming extensions of plastic on each side of said sheeting and moving, transverse to the direction of extrusion, the integral strand-forming extensions of plastic on at least one side of said sheeting while continuing extrusion to thereby extrude the said sheeting as a unitary entity.

This invention further comprises an extrusion apparatus comprising a plastic supply conduit flowably connected to a pair of die-carrying members mountable for relative movement transversely to the direction of extrusion in said apparatus, the said members having surfaces located in near-contact relationship to each other such that plastic sheeting is extrudable between them, each member having a set of strand-extruding dies having discharge orifices which open on said surfaces at the extrusion end of said dies, and means for moving at least one of said members during extrusion whereby the discharge orifices repeatedly pass one another while extruding strands integral with, but on opposite sides of said sheeting as it is extruded between the said surfaces.

A preferred embodiment of the apparatus of this invention comprises a sheeting extrusion apparatus comprising a plastic supply conduit flowably connected to a pair of die-carrying members mountable for relative movement transversely to the direction of extrusion in said apparatus, the said members having: contacting slideway surfaces, a sheeting extrusion slot adjacent said slideway surfaces on the side away from said plastic supply, strand-extruding dies opening into the walling of said slot for extruding strands integrally with said sheeting, and means for moving at least one of said members during extrusion.

In the preferred form of the apparatus of this invention, the die-carrying members are coaxial, i.e., the inner member has a circular extrusion face and the face of the outer member contains a circular opening with the inner member situated therein. In this embodiment, the strand-extruding dies are located on the circumference of the inner member and on the inner circumference of the outer member.

Preferably, the strand-extruding dies are in the form of grooves opening onto the coaxial surfaces of the die-carrying members; however, they can be tubular with their discharge orifices only opening onto the member surfaces.

In addition, the apparatus of this invention preferably will include means for rotating the die-carrying members continuously in opposite directions, in the same direction but at different rates, or in oscillating motion.

In the embodiment of the apparatus wherein the die-carrying members have contacting slideway surfaces, it is preferable to have supplementary feed ducts in the zone of the slideways for an additional supply of plastic to the extrusion slot; these may be in the form of open-sided grooves in the slideway surfaces. Also in this embodiment, the strand-extruding die means may be in the form of tubes by-passing the slideway surfaces and having their discharge ends opening into the extrusion slot, preferably into the walling of the slot and onto the outer face of the die-carrying member. Further in this embodiment, the extrusion slot may be recessed or rebated solely in one or the other die-carrying members or partially in both.

The plastic sheeting of this invention is preferably produced in continuous tubular form; however, cutting the tubes lengthwise will convert it into flat sheeting. It is further preferred that the said sheeting be tensioned in at least one direction so as to elongate the reinforcing strands. It is also preferred that any two strands on the same side of the sheeting be continuous and substantially equidistant from each other for the total length of the structure. It is most preferred that the strands on at least one side of the sheeting be helices about the tubular sheeting.

In its preferred form, the method of this invention is used to produce a continuous, tubular plastic sheeting by extruding a hollow, circular plastic mass with the strand-forming extensions of the plastic on the inner and outer circumferences thereof. Another preferred modification of the method includes treating the extruded structure to set the plastic, e.g., quenching. A further modification includes expanding the extruded structure to at least partially elongate the reinforcing strands. The method also can include the step of cutting the tubular sheeting lengthwise to form flat sheeting.

This invention is directed to plastic sheeting reinforced by or incorporating ribs which are simultaneously extruded integrally with the material of the sheeting as distinct from sheeting to which ribbing may be applied by welding or adhering thereto separately produced monofilaments or strands.

The die-carrying members may be circular and coaxial or they may be straight or rectilinear. Where circular die-carrying members are employed, continuous rotary or oscillatory relative motion is imparted and where rectilinear die-carrying members are employed rectilinear reciprocatory motion is employed.

A rib-forming series of dies and the supplementary feed ducts may be made of varying depths or diameters or widths, and the dies may be varied as to the number in the series or arranged in groups to suit the character of the ribbed product to be produced and the quantity of additional plastic to be supplied to the sheeting extrusion slot.

Where ribbing is to be formed on both sides of the sheeting, the ribs of one side preferably cross those on the other side in helical or inclined paths of opposite hand or sense such that assuming the plastic to be transparent or translucent the ribbing has the aspect of a net or meshwork. Alternatively, the ribs may be sinuous or zig-zag on one or both sides of the sheeting.

The term "sets of dies" is employed herein and in the claims, as usually each member will carry a considerable number of dies but the word "set" is also intended to include a minimum of a single die on one die-carrying member displaceable relatively to and cooperating with a number of dies on the other die-carrying member according to the number of strands predetermined for the sheeting.

By the term "plastic" (as used herein and in the claims) is meant:

(a) a synthetic thermoplastic capable of melt or compression extrusion in a molten state through dies and settable by a cooling medium on issuance from the dies. Suitable thermoplastic materials include polyamides or superpolyamides, such as nylon; polyesters; polyvinylchloride and copolymers thereof with vinylacetate or vinylidine chloride; polythene and the like and cellulose acetate; or (b) natural or synthetic rubbers, subsequently vulcanized or containing vulcanizing agents; or (c) those thermosetting plastic materials or mixtures thereof with thermoplastic materials, which are capable of extrusion; or (d) wet spinnable materials, such as viscose, cuprammonium protein material (e.g., from soya bean), capable of extrusion and setting by immersion in or spraying with a coagulant as the plastic emerges from the dies.

The invention will now be described with reference to the attached drawings wherein the same reference numerals represent corresponding parts and wherein:

FIGURE 5 is a general elevation view of an extrusion machine in which the apparatus of FIGURES 1 to 3 is shown partly in section located over a coolant tank and associated with haul-off mechanism for the extruded sheeting with a pattern of the strands or ribs diagrammatically illustrated on said sheeting.

FIGURE 6 is a sectional elevation showing a fragment of the die-carrying members illustrating a modified form or arrangement of strand-forming dies in lieu of that seen in FIGURE 3.

FIGURES 7 to 10 are perspective diagrams illustrating the principles of extrusion according to the invention in successive stages of extrusion of the stranded or ribbed sheeting.

FIGURE 14 is a sectional elevation of a preferred plastic extrusion apparatus of suitable form for supplying plastic under pressure to rotary die-carrying members according to the invention and shown in position in the lower part of the figure.

Figure 2:
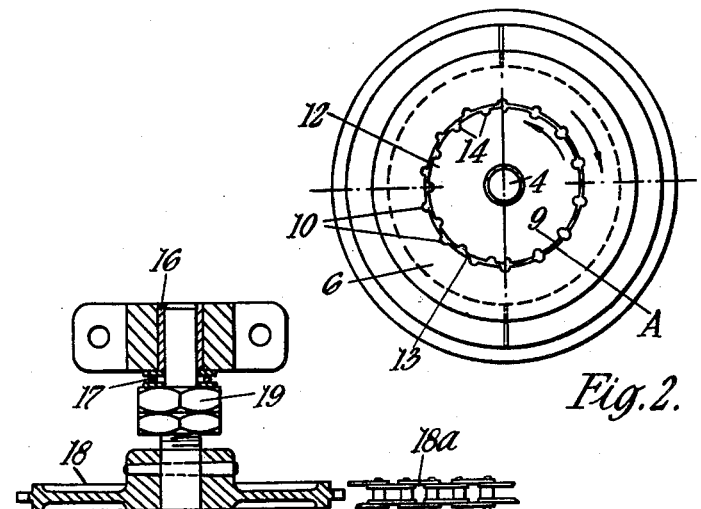
FIGURE 2 is an inverted plan view according to FIGURE 1.
Figure 1:
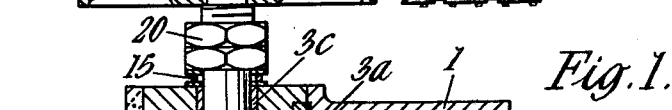
FIGURE 1 is a sectional elevation of extrusion apparatus according to the invention illustrating coaxial annular die-carrying members between which the sheeting is extruded.
Figure 4:
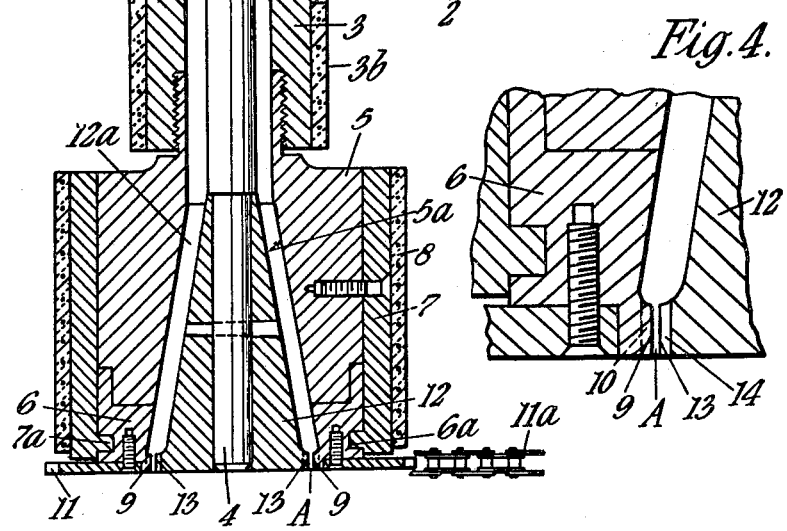
FIGURE 4 is a fragmentary enlargement showing the juxtaposition of the coaxial die-carrying members illustrated in the apparatus of FIGURE 1.
Figure 3:
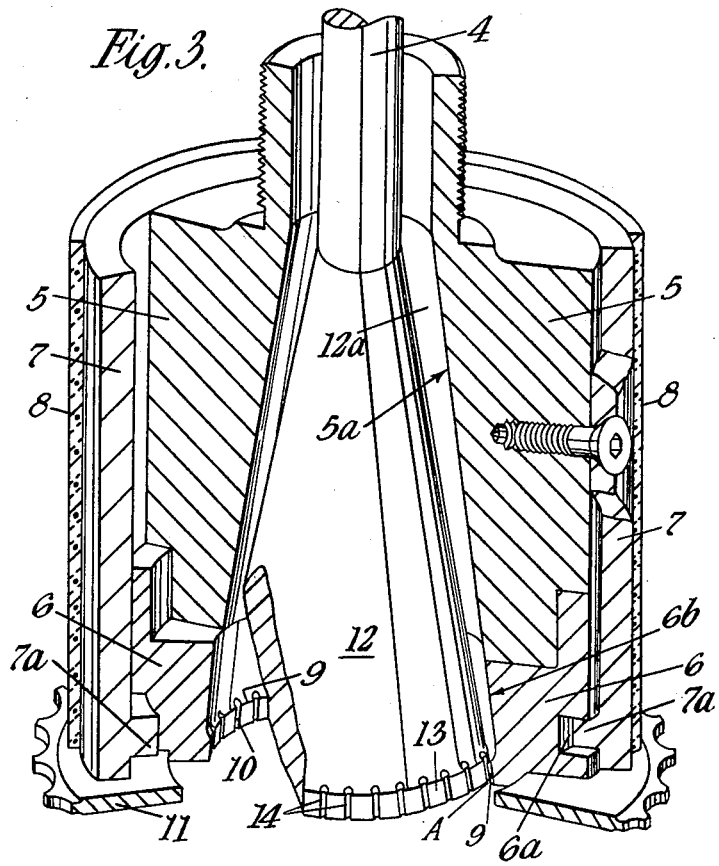
FIGURE 3 is a fragmentary perspective section of the apparatus seen in FIGURE 1.

It will be seen that FIGURE 14 above illustrates apparatus similar to (with modifications) the apparatus depicted in FIGURE 1.

FIGURE 15 is an inverted plan of one form of the die-carrying members seen in FIGURE 14 showing the sheeting extrusion slot and rib-extruding dies on both sides thereof.

Figure 16:
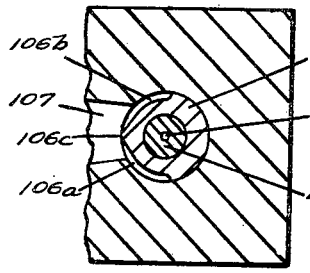
Figure 17:
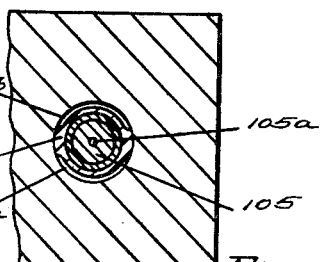

FIGURES 16 and 17 are, respectively, cross-sectional plans taken on the lines A—A and B—B of FIGURE 14.

Figure 18:
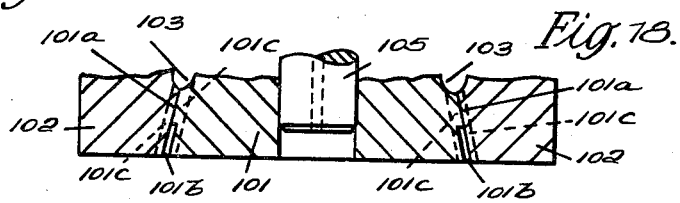

FIGURE 18 is a diagrammatic sectional elevation of the die-carrying members illustrating a form in which the sheeting extrusion annular slot is cut or recessed wholly in the inner of the coaxial die-carrying members.

Figures 19, 20:
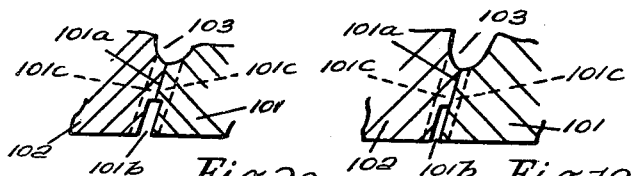

FIGURE 19 is a fragmentary sectional elevation illustrating the annular slot cut or recessed wholly in the outer die-carrying member.

FIGURE 20 is a fragmentary sectional elevation illustrating the annular slot cut or recessed partly in the inner die-carrying member and partly in the outer member.

In FIGURES 18, 19 and 20 the position of the rib-forming dies is indicated by dotted lines.

Figure 21:
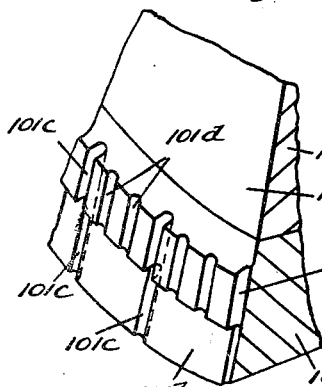

FIGURE 21 is a perspective view of the inner die-carrying member in which both rib-forming dies proper and plastic feed ducts through the slideway zone are illustrated in the form of laterally open grooves or channels.

Figure 22:
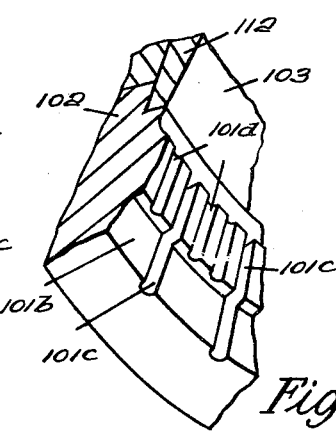

FIGURE 22 is a fragmentary prespective view of an outer die-carrying member (corresponding to FIGURE 19) illustrating the gooving form of rib-forming dies proper and plastic feed ducts through the slideway zone.

Figure 23:
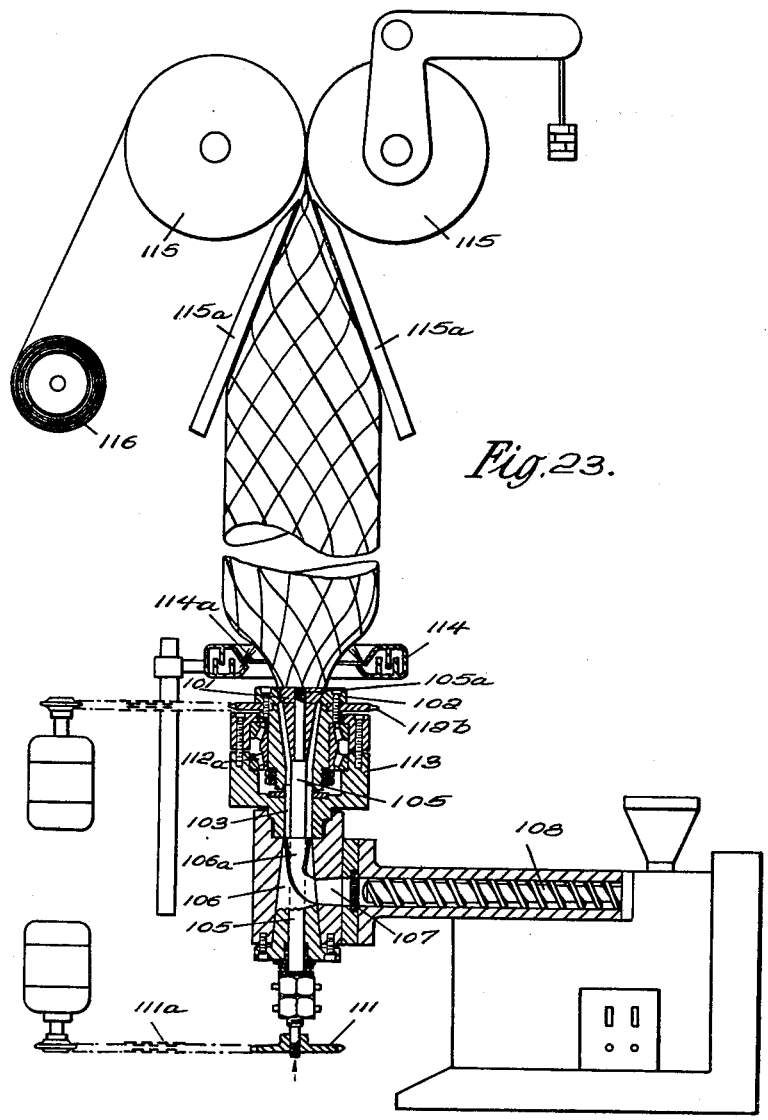

FIGURE 23 is an elevation partly in section, showing apparatus according to FIGURE 14 inverted for extruding the ribbed sheeting upwardly and modified by the addition of means for "ballooning" or expanding the diameter of the ribbed tubular sheeting as extruded, in a manner known in connection with the production of unribbed plastic sheeting.

Figure 24:
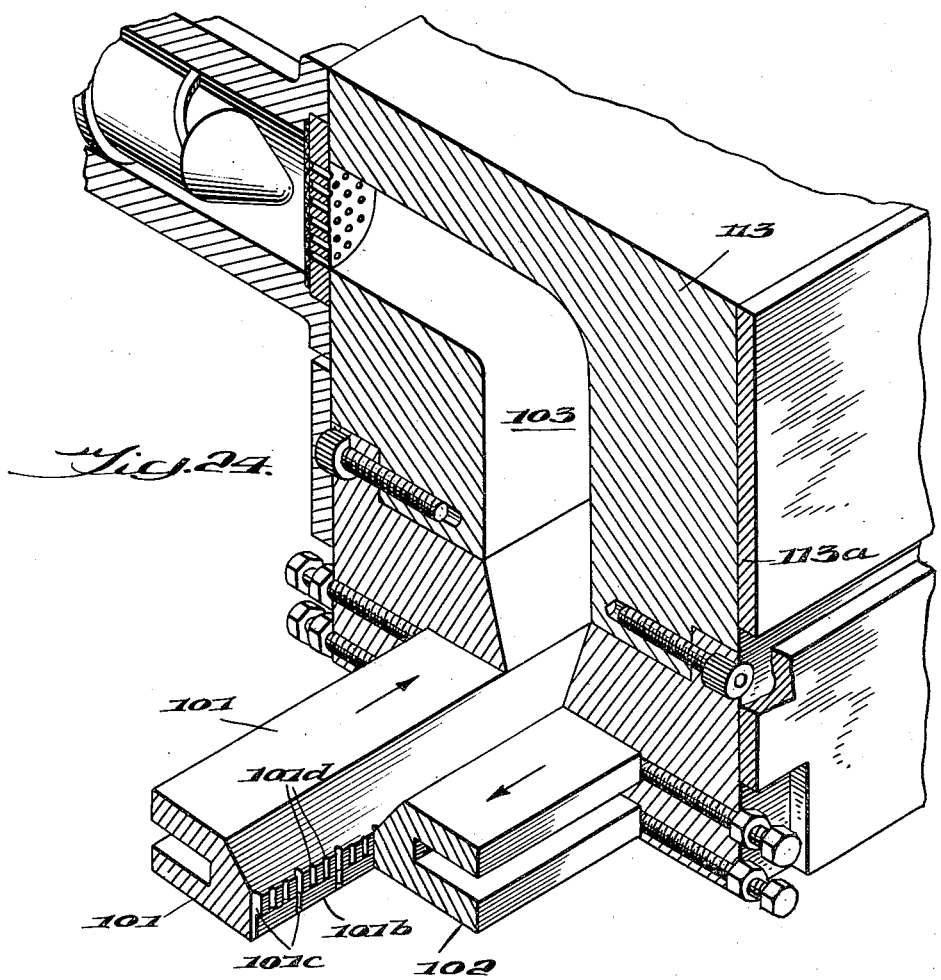

FIGURE 24 is a perspective sectional elevation of an extrusion apparatus of the form employing rectilinear die-carrying members for extruding flat sheeting.

Figure 25:
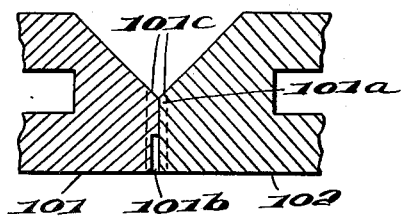

FIGURE 25 is a cross-sectional view of the dies in FIGURE 24.

In carrying out the invention according to a melt extrusion mode, described by way of reference to FIGURES 1, 2, 3, 4 and 5, in which annular coaxial sets of extrusion dies are employed, and between which continuous rotary displacement takes place transversely to the direction of extrusion, the thermoplastic for extrusion is contained in a head or pressure tank or reservoir or hopper a which is heat jacketed or heated in any convenient manner according to known practice. From the tank extends suitably supported conduit 1, in which a pressure worm 2 is mounted and continuously rotated in known manner to maintain a forced feed from the said tank. The end of the conduit 1 carries and discharges into, a feed chamber 3 through a gauze screen and breaker plate indicated at 3a. The chamber 2 has an electrically heated jacket 3b or other heating means in order to maintain the plastic delivered by the worm 2 at an appropriate extrusion temperature. The upper end of the chamber has a gland and bearing 3c for a vertical rotatable shaft 4 and the lower end is coupled to an extrusion chamber 5 secured by a screw-threaded neck or otherwise, the arrangement being such that the two chambers 3 and 5 are fixedly supported with the conduit 1 in a frame or base in any convenient manner on an extrusion machine *b* of known type as seen on the left of FIGURE 5.

The cavity of the chamber 5 has a frusto-conical wall 5*a* and supports an outer annular die-carrying member 6 in such a manner that it is capable (in the present instance) of rotation about the axis of the shaft 4. For example, the lower end of the chamber 5 may be rebated to receive an upwardly directed annular flange provided on the die member 6, the externally peripheral wall of which is formed with a race groove 6*a*. A split cylinder or sleeve 7 is releasably clamped around the chamber 5 and embracing the die member 6, thereby permitting the removal of the die member and replacement by another having a different set of dies.

The cylinder 7 is electrically or otherwise heated by a jacket 8 and has an annular rib or rail 7*a* located in the groove 6*a*. The rib and groove serve as a guiding and supporting race for the rotating die member 6.

The lower end of the inner peripheral wall 6*b* terminates in annular bevelled or coned surface 9 in which a set of spaced die ducts or slots 10 of suitable cross-sectional shape are formed. The die member 6 may be rotated by any suitable means, for instance it may have secured to its underside a chain wheel 11, the chain 11*a* of which is passed around another chain wheel 11*b* which is driven through gearing from a variable speed electric motor 11*c* or other suitable source of power.

The shaft 4 carries a replaceable inner or core-like die member 12 which cooperates in near-contact or juxtaposition with the outer die member 6, whereby a sheeting extrusion clearance or slot A is provided. This inner die member is frusto-conical, preferably at a slightly less steep angle than the conical wall 5*a*, such that the two conical wallings enclose an annular conical distributing passageway or cavity 12*a* for the plastic.

The lower end of the member 12 terminates in a circular surface 13 which is coned exactly to accord in spaced relationship with the coning of the coaxial surface 9 of the die member 6.

The surface 13 has a set of spaced die ducts or slots 14 situated opposite to the set 10 of the surface 9. The dies 10 and 14 in the present example are in the form of grooves or slots which are open to the surfaces 9 and 10, respectively, and pass opposite to one another during relative rotation of the die-carrying members 6 and 12 such that extrusion of strands takes place in common confluently with the extrusion of the sheeting through the clearance A. Extrusion of material through this annular space creates a smearing, mixing or turbulent action on the polymer resulting in a superior sheeting to that produced by fixed annular dies.

The shaft 4 is hung on a ball or roller thrust race 15 above the gland 3*c* of the feed chamber 3 and the upper extremity of the shaft is steadied in a bearing 16 and a second thrust race is provided at 17.

Between the two races a chain wheel 18 is pinned to the shaft 4 as a convenient means for imparting rotation to the shaft. The chain 18*a* may be driven from the same or a different source as the chain 11*a*, such as a variable speed electric motor.

On each side of this chain wheel the shaft is screw-threaded for pairs of die-setting adjustable and lock nuts 19 and 20. By the relative adjustment of these nuts, the appropriate relationship is maintained between the edges or surfaces 9 and 13.

In operation, assuming the die-carrying members 6 and 12 are both continuously rotated by their chain wheels in opposite directions (as shown by the arrows) at the same rate, tubular plastic sheeting will be extruded through the clearance A between the members 6 and 12 with the simultaneous extrusion through the dies 10 and 14 of strands which are laid in crossing helices at opposite sides of the sheeting.

The strands extruded through the dies 10 and 14 will lie, as viewed through the sheeting, as a net or meshwork with diamond-shaped meshes, and their size will depend upon the length of the spacing or pitch interval between the dies of the sets and the helical angle or obliquity of the strands will depend upon the speed of rotation—the faster the speed, the shallower or slower will be the angle or pitch of the crossing helices of the strands, while correspondingly the slower the speed of rotation, the steeper the helical strands will become.

The finished form of the stranded sheeting as extruded will be tubular but the tubular form may be slit longitudinally to provide a flat fabric as in known tubular sheeting production.

The sheeting as extruded will be subjected to a setting or fixing treatment as by spraying with or immersing it in a cooling liquid in a tank immediately below the extrusion dies.

The extrusion apparatus above described is mounted over, or its lower surface immersed in, a bath of cooling liquid, which may be water or other liquid appropriate for setting the particular plastic under treatment as soon as the sheeting is extruded from the dies. Alternately, the cooling or fixing of the extruded fabric may be effected by spraying it with cooling liquid or subjecting it to refrigerated air or gas currents.

Within the cooling bath or associated therewith or adjacent the spraying or refrigerating zone, haul-off rolls or equivalent means are provided to take up and support the sheeting in a manner similar to that adopted in the production of sheeting of known kind.

Appropriate setting or fixing means and haul-off apparatus are exemplified in FIGURE 5 with respect to the annular extrusion method. The extruded tubular sheeting as it emerges from the dies is drawn over a vertical cylindrical support 21 calculated to maintain the diameter of the tubular sheeting while setting and to ensure an even haul-off.

The support 21 may be surrounded with a suitably supported tension ring 21*a* between which and the cylinder the sheeting passes and on which the tension ring bears with appropriate friction.

Assuming that a finally flat sheeting is required, it is convenient to mount a cutting or slitting wheel 22 below the cylinder 21.

The slit sheeting is drawn downwards through a pair of rollers 23 which are driven through variable speed means from a suitable source (not shown).

From the rollers 23 the sheeting is carried away as over a roller 24, to a suitable batching or collecting source.

If the setting or fixation is to be by immersion in a liquid the above-described haul-off mechanism is located in a coolant tank 25, the level of the liquid in which is indicated at 25*a*.

Where the sheeting is not to be slit but is to be delivered in tubular form, the bracket mounting on the side of the tank 25 (see FIGURE 5) for the cylinder 21 is obviously unsuitable and the cylinder 21, if employed, requires to be suspended from the inner die member 12 or on the shaft 4, and when the inner die is rotated and not stationary, the suspension should include an anti-friction bearing.

It will be observed that for any given extrusion rate and relative displacement speed of the dies, the cross-sectional area of the strands may be diminished and the size of the meshes formed by the strands on the sheeting as extruded may be increased by appropriately increasing the haul-off rate by the rollers 23.

The relative rotational displacement movement may take place in the several ways set out hereunder:

(a) The die-carrying members may continuously rotate in opposite directions at the same rate (as above described in reference to FIGURES 1 to 4).

(b) The members may be rotated continuously in opposite directions at different rates.

(c) The members may be rotated continuously in the same direction but at differential rates such that one set of dies is progressively overtaking the other set to bring about the registration and non-registration positions.

(d) Of the two die-carrying members, one may be stationary and the other may be rotated continuously, when the stationary dies will produce longitudinal strands and the moving dies will extrude helical or oblique strands.

Where the dies do not move at the same rate and where one set is stationary, that moving at the faster rate or the moving die will extrude longer filaments or strands than those extruded by the slower moving or stationary dies, and consequently a greater quantity of plastic will be required, and this is supplied by making these dies of greater cross-sectional area than the stationary or slower moving set.

By the several kinds of displacement indicated above, it will be appreciated that the patterns created by the extruded strands may be varied considerably.

As already pointed out, the dies need not be open slots but may be of the closed-figure or tubular type, provided they are appropriately directed and their discharge orifices open at the surfaces 9 and 13.

FIGURE 6 exemplies a form of converging die ducts 10 and 14 in members 6 and 12 where the lower ends of these ducts are bevelled off and form extrusion discharge orifices opening on the surfaces 9 and 13.

The spacing and number of dies in one set may be different from those of the other set, including the case (already indicated) of where one set consists only of a single die, and in some circumstances certain of the dies in either set have a different shape or a different cross-sectional area from other dies of the same set.

The diameter of the annular sets of dies need not be a determining factor in the corresponding dimensions of the extruded sheeting as such may become extended considerably, for example by employing low relative displacement speeds in conjunction with closely spaced dies. For example, a very small die, such as an inch in diameter, may be used to produce a net of several feet in diameter by adjusting the rate of haul-down in relation to the rate of extrusion so as to apply adequate tension to elongate the strands with little or no effect upon the intersections.

Where set spinning plastics are to be used, the same kind of apparatus as described above is employed, except that the worm feed 2 for the plastic is replaced by a pump feed such as known in wet spinning apparatus for monofilaments to force the plastic through the die orifices which are immersed in a coagulating bath.

The basic principle and operation of the extrusion according to the invention is exemplified in FIGURES 7 to 10 wherein are illustrated the several stages of the extrusion of the plastic from the dies 10 and 14 and between the die-carrying members 6 and 12, as described with reference to FIGURES 1 to 5, but for convenience the die-carrying members are shown rectilinear and the die member 6 moves and the die member 12 is stationary.

In FIGURE 7 the strands $b$, $b^1$, extruded through the dies 14, 10, have just crossed one another at $a$ on opposite sides of the sheeting $A^1$. The strands $b$, $b^1$ continue to be extruded, respectively, through the stationary dies 14, and the dies 10 which are seen transversely moving away from the dies 14 in FIGURE 8. In FIGURE 9, the dies having again arrived opposite one another, the strands cross at $a^2$ and as the motion of the member 6 continues (see FIGURE 10) the strands $b$, $b^1$ are laid in a mesh pattern on the sheeting crossing one another on opposite sides thereof at the points $a$.

The cross-sectional area of dies employed in this invention may be varied over a considerable range from very fine dies of the order found in the finer type of hypodermic needles for the production of correspondingly fine strands, to coarse or large cross-sectional areas for the production of stout or heavy duty crossing strands. It will be appreciated that the size of the strand meshes will depend upon the spacing of the dies of the sets relative to one another of each set and the rate of displacement in relation to the extrusion pressure rate and the haul-off speed.

It will be understood that in producing the fine stranded sheeting the spacing of the dies of each set will be correspondingly reduced, and in any case the mesh size may be diminished by reducing the said spacing.

The sheeting as produced according to this invention may be so stout as to be more or less self-sustaining meshed sheets or they may have different degrees of flexibility and in the finer forms the sheeting may be so flexible as to fall in folds or be capable of draping.

High rates of production of the extruded sheeting may be accomplished as such is only limited by the possible rates of extrusion and fixation, and as the sheeting is completed in a single continuous process, manufacturing costs should be low.

Figure 11:
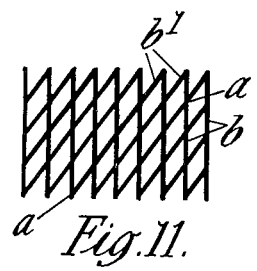
FIGURES 11 to 13 are diagrams of several of the various patterns which may be made by the strands upon the opposite sides of the sheeting, the latter itself not being shown in these figures.
Figure 12:
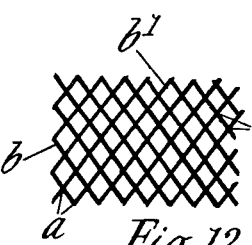
Figure 13:
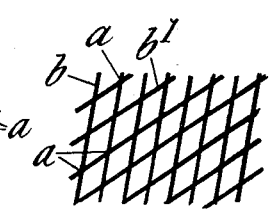

Representative patterns such as formed by the strands upon the extruded sheeting are illustrated in FIGURES 11 to 13 as examples of several of the various die displacements. The sheeting itself is not shown in these figures. In FIGURE 11 an arrangement is shown in which longitudinal strands issue from stationary dies and steep helical strands issue from the moving dies. In FIGURE 12 the strand arrangement is shown as produced where both sets of dies rotate in opposite directions, while when dies move in the same direction but at differential speeds the strand pattern as illustrated in FIGURE 13 is produced.

The sheeting after extrusion and fixation may constitute the finished article or such may be subjected to further treatment or treatments according to the products it may be desired to market.

In FIGURES 14 through 25 the embodiment of the apparatus will now be described wherein the die-carrying members have contacting slideway surfaces. (In these figures, the reference numerals are different from those in FIGURES 1 through 13, even for similar parts, and all are numbers greater than 100.)

Referring now to FIGURES 14 through 23, this embodiment of the apparatus comprises a pair of coaxial die-carrying members 101 and 102 mounted to close the lower end of a forced feed plastic supply chamber 103 of extrusion apparatus of known general character, such as illustrated in FIGURE 14. The inner die-carrying member 101 is disc-like and is secured to a conical head 104 mounted on a shaft or tube 105 which extends through the supply chamber 103 and passes out through a tapering plug element 106 at the end remote from the dies. The plug element 106 has its peripheral surface recessed with a pair of diametrically oppositely disposed plastic distributing channels 106a and 106b (see FIGURES 16 and 17) which meet at 106c opposite the plastic supply orifice 107 which receives plastic from a suitable source via the pressure worm 108. The channels 106a and 106b (see FIGURES 14, 16 and 17) are divergent in the direction of the chamber 103 to disperse the plastic around the entry to the chamber. The shaft 105 passes through a thrust bearing 109 and is axially adjustably secured by nut 110 and locknut 110a. When motion is to be imparted to inner die member 101, the shaft is driven through a chain wheel 111 and chain 111a from any suitable power source or any other appropriate means may be provided to impart motion to said shaft.

The outer die-carrying member 102 is annular and is located around the inner die member, and is detachably mounted on a supporting member 112 which also serves as the outer walling of the lower part of the chamber 103. This member may be a fixture if it is intended that the outer die member 102 should permanently be stationary. When the die member 102 is to be revolved, the member 112 is mounted in bearings carried by the outer two-part housing 113 of the apparatus. The housing 113 may be provided with electrical heating elements 113a and, in general, the apparatus may be supplied with heating means where required. The bearings for the member 112 are preferably of the tapered roller thrust type as shown at 112a in FIGURE 14. For the purpose of rotating the outer die member 102 and its support 112, a chain wheel drive 112b may be provided or rotation may be imparted by any other suitable drive means from a convenient power source.

The adjacent peripheral surfaces of the two die members 101 and 102 are accurately ground to provide slideway surfaces in the zone 101a which guide and maintain the accurate relationship during motion of the dies carried by the members. The ground surfaces are preferably frusto-conical with the smaller end of the cone disposed towards the supply source, or alternatively, if desired the taper of the conical surfaces may be reversed so that the pressure in the chamber serves to maintain a close slideway junction.

Both die-carrying members may be detachably engaged with their mounting means, as indicated in FIGURE 14, in order that they may be replaced by other die members having a different arrangement or size of dies.

The die-carrying members 101 and 102 also essentially include, in addition to the slideway zone, an outer or lower zone in which an annular die slot 101b is located for the extrusion of the sheeting component of the extrudate and into which the ribbing dies 101c pass. In manufacturing these die-carrying members, it is convenient to make the whole periphery accurately ground with frusto-conical complementary surfaces and then to produce the sheeting slot by grinding back the peripheral surfaces radially commensurate in width with the gauge of the sheeting to be produced.

The annular extrusion-slot-forming operation may be carried out to locate the slot 101b as a recess or rebate in the inner die member 101 with the opposite side of said slot constituted by a continuation of the slideway surface 101a on the member 102, as shown in FIGURE 18, or the recess or rebate may be located in the outer die member 102 with the opposite side or walling of the slot constituted by a continuation of the slideway surface 101a of the inner member 101 as shown in FIGURE 19. According to a third alternative, a slot-forming recess or rebate is formed both on the inner member 101 and on the outer member 102 with the slideway surface 101a lying intermediate the rebate wallings as illustrated in FIGURE 20.

In one form, the rib-forming dies 101c are grooves in the outer or inner wall or both walls (see FIGURE 15, FIGURES 21 and 22, and the dotted lines in FIGURES 18, 19 and 20) of said slot, according to whether the ribbing is to be on the outside, the inside or both sides of the sheeting. The ribbing dies extend from the outer surface or discharge side of the die-carrying members 101 and 102 through the sheeting slot zone 101b and slideway 101a into communication with the feed supply chamber 103, in other words, the ribbing dies 101c are throughway grooves traversing the die members in an axial direction.

In order to provide an adequate supply of plastic to the sheet-forming slot, it is necessary to employ supplementary or additional ducts 101d cut through the zone of the slideway surfaces (see FIGURES 21 and 22), except where the throughway dies 101c are in sufficiently close proximity to one another to afford an adequate supply of plastic to the sheeting slot 101b. These additional ducts may be in the form of grooves opening onto the slideway surface or they may be in the form of tubes, traversing one or both die-carrying members, which tubes communicate at one end with the feed chamber while the other end emerges in the sheeting slot 101b, thus providing a supply of plastic to the sheeting slot independent of the slideway surfaces. Similarly, the rib-forming dies 101c instead of being open grooves as shown in the drawings (FIGURES 21 and 22), may be in the form of tubes or bores by-passing the slideway 101a and delivering plastic from the chamber 103 onto one or other or both wallings of the slot 101b at its mouth or discharge end and onto the outer faces of one or both die-carrying members.

In FIGURES 21 and 22 perspective views of the coaxial inner and outer die members 101 and 102 are illustrated in the form in which both ribbing dies 101c and feed ducts 101d are provided. The inner die member 101 has a central hole 105a for receiving the end of the shaft 5.

For producing certain products, the shaft on which the inner die-carrying member is mounted is tubular or has an axial bore for the purpose of forcing air into the sheeting tube as extruded from the dies with a view to inflating or expanding the ribbed extruded tube of material into a thinner tubular film of larger diameter. Also, in making thicker-walled tubes or pipes, air pressure may be utilized to maintain the shape of the extrudate or to prevent the collapse of the tubular form prematurely without causing actual expansion.

This expansion process (which is sometimes known as "ballooning") is illustrated in FIGURE 23 where the extrusion plant of FIGURE 14 is shown inverted to extrude the ribbed sheeting in an upwardly direction in a manner known in connection with the extrusion and ballooning of plain sheeting, as an alternative to downward or horizontal extrusion.

For the ballooning method the shaft 105 is tubular or has a central bore 105b connected to a source of air or gas pressure. Surrounding the ribbed tubing as it issues from the annular die slot 101b is a circular baffled air header or duct 114 having an annular slot 114a for blowing air onto the ribbed sheeting tube as it is being expanded.

A suitable distance from the die-carrying members, a pair of haul-off rollers 115 are provided which draw the sheeting upwardly at a rate suitable to the rate of extrusion. Boards 115a may be employed for collapsing the ballooned tube preparatory to its entry into the nip between the rollers 115. From these rollers the sheeting may be passed to a collecting reel 116. If desired, flat (single thickness) sheeting may be produced from tubular extruded stock by slitting the tubing on its way to the haul-off rollers or subsequently in known manner.

The pitch of the rib-forming dies is predetermined to suit the ribbing effect which is to be produced and, as indicated above, interchangeable die-carrying members may be employed each having a different number, arrangement, or cross-sectional area of ribbing dies. Similarly, die-carrying members having annular slots of different radial dimensions or widths for the sheeting zone may be provided. The rib-forming slots or grooves in one die-carrying member may have a different cross-sectional area from those in the other member.

Although there will usually be employed die-carrying members with a number or series of throughway rib-forming dies (with or without a number of feed ducts in the slideways) traversing one or both members, it will be seen that members each having a single rib-forming die therein will produce sheeting having a helical or zigzag rib integrally formed on the sheeting on opposite sides thereof, or if the single rib-forming die is provided in only one die-carrying member, the extruded sheeting will have a single continuous rib integrally formed on one side only of the sheeting. It will be understood, however, that where the ribs are to provide tear-resisting qualities, ribs on opposite sides of the sheeting should intersect or cross one another netwise.

The preferred relative motion to be imparted to the coaxial die-carrying members is that the members should be given continuous rotary motion in opposite directions. Other types of motion may include rotation of both members in the same directions but at different rates or both die members may be oscillated in opposite directions, or the inner die member or the outer die member may be oscillated or continuously rotated while the other die member is maintained stationary. By rotating the dies continuously in opposite directions, any tendency to twist the extruded product, particularly where such is inflated, is avoided. Should it be desired to maintain one die stationary while the other rotates continuously, or where there is unidirectional continuous rotation of both members, thus creating a tendency for the extruded sheeting to revolve, this may be counteracted by revolving the haul-down rollers about the axis of the tubular sheeting in the same direction in which the sheeting tends to revolve.

FIGURES 24 and 25 illustrate suitable apparatus for employing rectilinear die-carrying members having contacting slideway surfaces. Reference numbers 101 and 102 have been used to designate the two die-carrying members since they are equivalent to those in FIGURES 14 through 23, although they are rectilinear and not coaxial. Although slot 101b is shown recessed in only one die-carrying member 101, it could be recessed in member 102 or partially recessed in both as illustrated in FIGURES 18, 19 and 20.

The rectilinear die-carrying members can be reciprocated by suitable means known in the art and by those means shown and described in Mercer, U.S. Patent 2,919,467 of which patent this application is a continuation-in-part. See particularly FIGURES 6, 7, 8, 8a and 8b of the Mercer patent.

Each member can be mounted in rectilinear bearings on each side of the chamber to permit relative rapid reciprocation to be effected between the two members. The ends of the die-carrying members project beyond the corresponding ends of the chamber a distance greater than the pitch of the reciprocating or arcuate oscillatory stroke and the end walls of the chamber under which the members move can be fitted with sealing means to prevent the escape of the plastic laterally. The die-carrying members are provided with a slideway zone 101a and a sheet component zone embodying a rectilinear slot 101b in a similar manner to that above described in connection with the rotary apparatus. Likewise, the sheeting zone is provided with the ribbing dies 101c traversing the sheeting zone, additional ducts through the slideways 101d being provided, where necessary, for supplementing the feed of plastic to the sheeting extrusion zone.

Any suitable means may be provided for imparting reciprocatory motion to the rectilinear die members. In particular, the reciprocation should be such that the period of dwell at the end of the stroke should be a minimum, and this also applied to the oscillation of rotary coaxial die-carrying members.

The plastic sheeting made according to this invention is useful for any purpose to which ordinary plastic film can be used, particularly when higher strength and tear-resistance, and more decorative appearance are desired. The latter may be especially enhanced by extruding ribbing which is thicker than the film or sheeting component and thereby obtaining stronger colored ribs with almost clear or apparently uncolored film. The method and apparatus of this invention provide simple, continuous and high quality uniform production of the ribbed sheeting.

What is claimed is:

1. A method of manufacturing a plastic sheeting containing integral reinforcing ribs on both sides of the sheeting which comprises extruding the plastic in the form of thin sheeting containing integral, rib-forming outward extensions of plastic on each side of said sheeting and moving, transverse to the direction of extrusion, the integral rib-forming extension of plastic on at least one side of said sheeting while continuing extrusion to thereby extrude the said sheeting as a unitary entity.

2. A method of manufacturing a tubular plastic sheeting containing integral reinforcing ribs on both sides of the sheeting which comprises extruding the plastic in the form of a hollow circular plastic mass containing integral, rib-forming outward extensions of plastic on the inner and outer circumferences of the circular plastic mass and moving, transverse to the direction of extrusion, the integral rib-forming extensions of plastic on at least one side of the said plastic mass while continuing extrusion to thereby extrude the said sheeting as a unitary entity.

3. Method according to claim 2 including the step of expanding the extruded structure to at least partially elongate the reinforcing ribs.

4. An apparatus for the extrusion of sheeting comprising a plastic supply conduit flowably connected to a pair of die-carrying members mountable for relative movement transversely to the direction of extrusion in said apparatus, the said members having contiguous, substantially coextensive, opposed surfaces spaced one from the other a distance such that plastic sheeting of the desired thickness is extrudable therebetween, each member having a set of rib-extruding dies having discharge orifices which open on said surfaces at the extrusion end of said dies, and means for moving at least one of said members during extrusion whereby the discharge orifices repeatedly pass one another while extruding ribs integral with, but on opposite sides of, said sheeting as it is extruded between the said surfaces.

5. Apparatus according to claim 4 wherein the die-carrying members are rectilinear and the relative movement between the two is reciprocatory.

6. Apparatus according to claim 4 wherein the die-carrying members are coaxial and the rib-extruding dies are tubular and have their discharge orifices opening onto the coaxial surfaces of the die-carrying members.

7. Apparatus according to claim 6 including means for expanding the tubular sheeting produced.

8. An apparatus for the extrusion of sheeting comprising a plastic supply conduit flowably connected to a pair of die-carrying members mountable for relative movement transversely to the direction of extrusion in said apparatus, the said members having: contacting slideway surfaces, a sheeting extrusion slot adjacent said slideway surfaces on the side away from said plastic supply, rib-extruding dies opening into the walling of said slot for extruding ribs integrally with said sheeting, and means for moving at least one of said members during extrusion.

9. Apparatus according to claim 8 wherein the die-carrying members are rectilinear and the relative movement between the two is reciprocatory.

10. Apparatus according to claim 8 wherein the die-carrying members are coaxial.

11. Apparatus according to claim 8 having supplementary feed ducts in the zone of the slideways for an additional supply of plastic to said sheeting extrusion slot.

12. Apparatus according to claim 11 wherein said supplementary feed ducts are in the form of open-sided grooves in said slideway surfaces.

13. Apparatus according to claim 8 wherein said rib-extruding die means are in the form of open-sided grooves.

14. Apparatus according to claim 8 wherein said rib-extruding die means are in the form of tubes by-passing the slideway surfaces and having their discharge ends opening into the walling of the said sheeting slot and onto the outer face of the die-carrying member.

15. Apparatus according to claim 8 wherein the said supplementary feed ducts are in the form of tubes by-passing the slideway surfaces and opening into the said sheeting extrusion slot.

16. Apparatus according to claim 8 wherein the sheeting extrusion slot is recessed solely in one die-carrying member of the pair.

17. Apparatus according to claim 8 wherein the sheeting extrusion slot is recessed partially in each of the die-carrying members with the slideway surface lying intermediate the recesses.

18. Apparatus according to claim 10 including means for rotating the die-carrying members continuously in opposite directions to one another.

19. Apparatus according to claim 10 including means for oscillating the die-carrying members.

20. Apparatus according to claim 10 including means for expanding the tubular sheeting produced.

References Cited by the Examiner

UNITED STATES PATENTS

| | | | |
|---|---|---|---|
| 2,281,635 | 5/42 | Strauss | 154—46 |
| 2,750,631 | 6/56 | Johnson | 18—57 |
| 2,851,389 | 9/58 | Lappala | 154—46 |
| 2,892,212 | 6/59 | Rhodes | 18—12 |
| 2,919,467 | 1/60 | Mercer | 18—12 |

ALEXANDER H. BRODMERKEL, *Primary Examiner.*

WILLIAM J. STEPHENSON, *Examiner.*